(12) United States Patent
Takato

(10) Patent No.: US 9,846,295 B2
(45) Date of Patent: Dec. 19, 2017

(54) OBJECTIVE OPTICAL SYSTEM

(71) Applicant: OLYMPUS CORPORATION, Hachioji-shi, Tokyo (JP)

(72) Inventor: Hideyasu Takato, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/251,327

(22) Filed: Aug. 30, 2016

(65) Prior Publication Data
US 2016/0370558 A1 Dec. 22, 2016

Related U.S. Application Data

(63) Continuation of application No. PCT/JP2015/068619, filed on Jun. 29, 2015.

(30) Foreign Application Priority Data

Jul. 11, 2014 (JP) ................................ 2014-143112

(51) Int. Cl.
G02B 9/14 (2006.01)
G02B 9/26 (2006.01)
(Continued)

(52) U.S. Cl.
CPC .............. *G02B 9/14* (2013.01); *G02B 5/005* (2013.01); *G02B 9/26* (2013.01); *G02B 9/64* (2013.01);
(Continued)

(58) Field of Classification Search
None
See application file for complete search history.

(56) References Cited

U.S. PATENT DOCUMENTS

| 4,059,344 A | 11/1977 | Yamasita |
| 4,312,572 A | 1/1982 | Yamashita et al. |

(Continued)

FOREIGN PATENT DOCUMENTS

| JP | 55015005 B2 | 4/1980 |
| JP | 61044283 B2 | 10/1986 |

(Continued)

OTHER PUBLICATIONS

International Search Report (ISR) dated Sep. 8, 2015 and Written Opinion issued in International Application No. PCT/JP2015/068619.

(Continued)

*Primary Examiner* — Darryl J Collins
(74) *Attorney, Agent, or Firm* — Holtz, Holtz & Volek PC

(57) ABSTRACT

The objective optical system includes in order from an object side, a first unit having a positive refractive power, a second unit having a negative refractive power, and a third unit having a positive refractive power, and focusing is carried out by moving the second unit, the first unit and the third unit are fixed at the time of focusing, and the first unit G1 includes in order from the object side, a negative lens L1, one of a positive lens and a cemented lens, and a positive lens, and the third unit includes a positive lens, and a cemented lens of a positive lens and a negative lens, and the objective optical system satisfies the following conditional expression (3)

$$-20 < f_2/f < -5 \quad (3)$$

where,
$f_2$ denotes a focal length of the second unit, and
f denotes a focal length of the overall objective optical system in a normal observation state.

3 Claims, 11 Drawing Sheets

(51) Int. Cl.
  *G02B 13/04* (2006.01)
  *G02B 5/00* (2006.01)
  *G02B 9/64* (2006.01)
  *G02B 13/00* (2006.01)
  *G02B 13/24* (2006.01)
  *G02B 23/24* (2006.01)
  *G02B 27/00* (2006.01)

(52) U.S. Cl.
  CPC ............ *G02B 13/006* (2013.01); *G02B 13/04* (2013.01); *G02B 13/24* (2013.01); *G02B 23/243* (2013.01); *G02B 27/0025* (2013.01)

(56) References Cited

U.S. PATENT DOCUMENTS

| | | | |
|---|---|---|---|
| 6,252,723 | B1 | 6/2001 | Nagaoka |
| 6,327,101 | B1 | 12/2001 | Miyano |
| 6,433,937 | B1 | 8/2002 | Konno |
| 7,764,437 | B2 | 7/2010 | Yamamoto |
| 8,035,900 | B2 | 10/2011 | Yamamoto |
| 2002/0055669 | A1 | 5/2002 | Konno |
| 2007/0258150 | A1 | 11/2007 | Takato |
| 2011/0211267 | A1 | 9/2011 | Takato |
| 2014/0233110 | A1* | 8/2014 | Sone ........................ G02B 9/14 359/738 |
| 2015/0268460 | A1 | 9/2015 | Takada |

FOREIGN PATENT DOCUMENTS

| | | |
|---|---|---|
| JP | 06317744 A | 11/1994 |
| JP | 2876252 B2 | 3/1999 |
| JP | 11316339 A | 11/1999 |
| JP | 2000267002 A | 9/2000 |
| JP | 2000330015 A | 11/2000 |
| JP | 2002028126 A | 1/2002 |
| JP | 2007155887 A | 6/2007 |
| JP | 2007260305 A | 10/2007 |
| JP | 4819969 B2 | 11/2011 |
| WO | 2014088104 A1 | 6/2014 |

OTHER PUBLICATIONS

International Preliminary Report on Patentability (IPRP) dated Jan. 26, 2017, issued in counterpart International Application No. PCT/JP2015/068619.

* cited by examiner

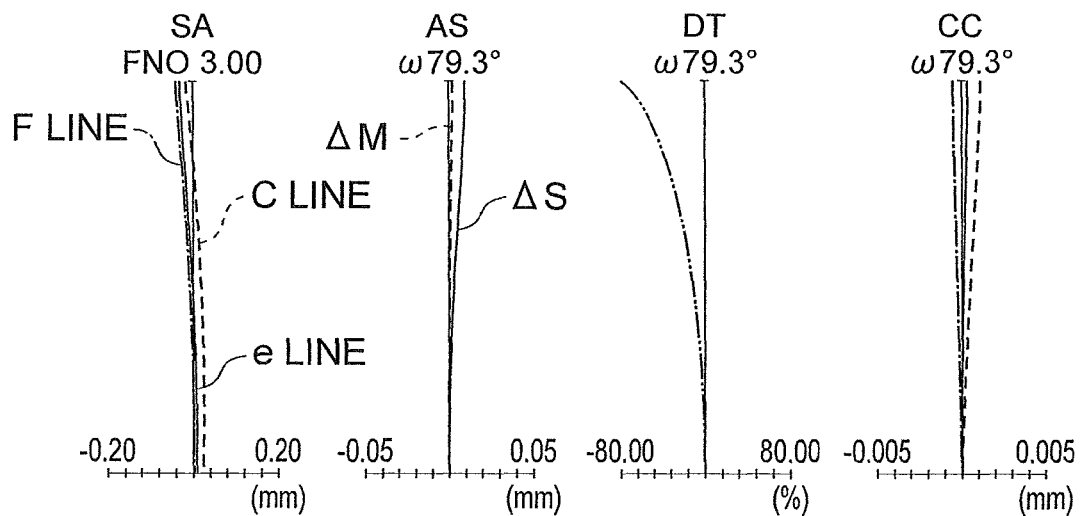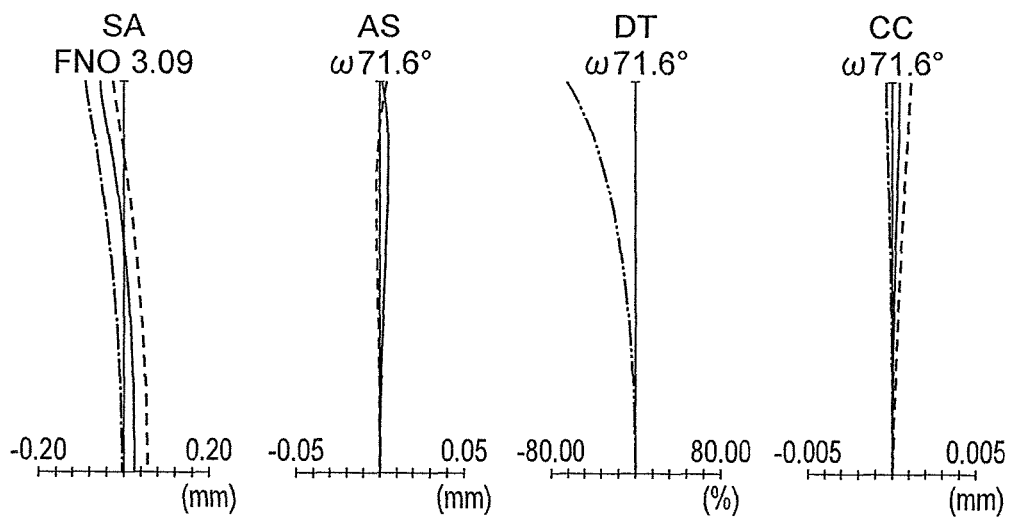

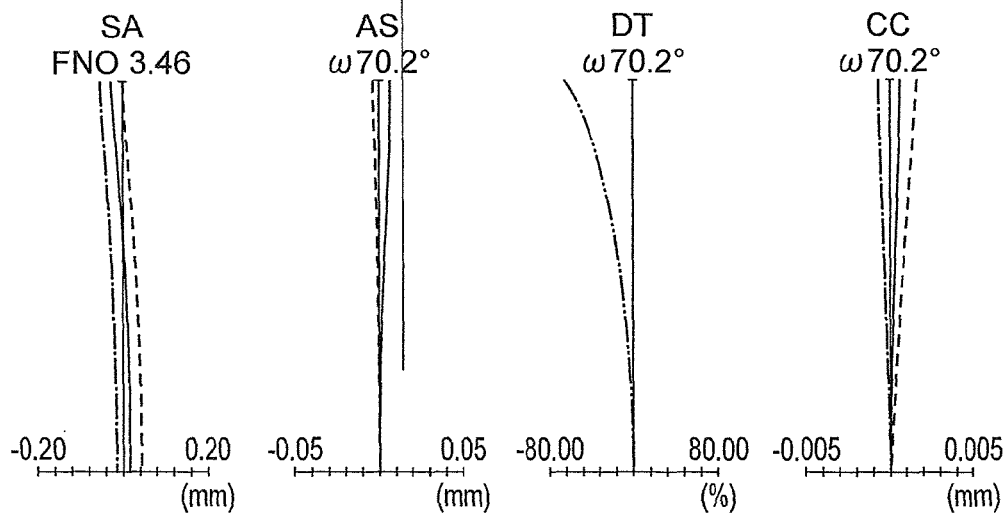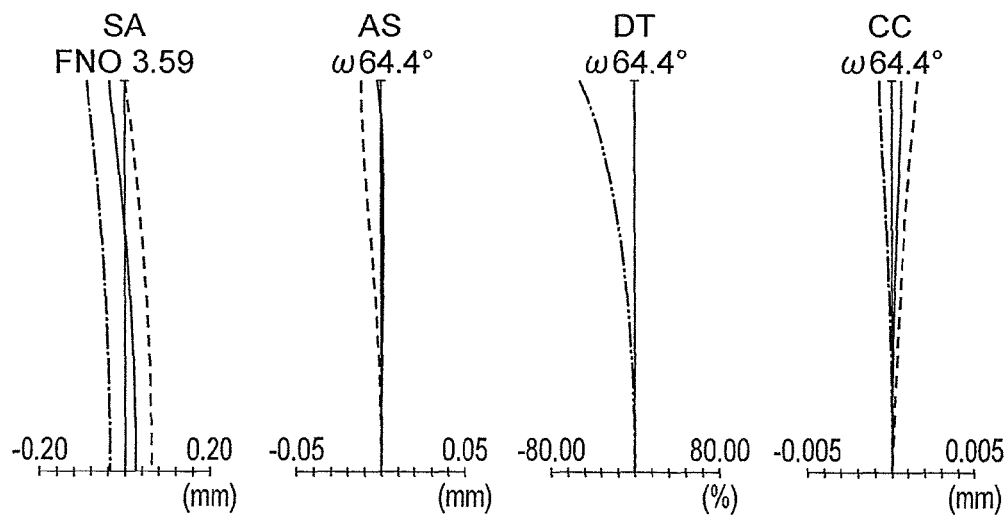

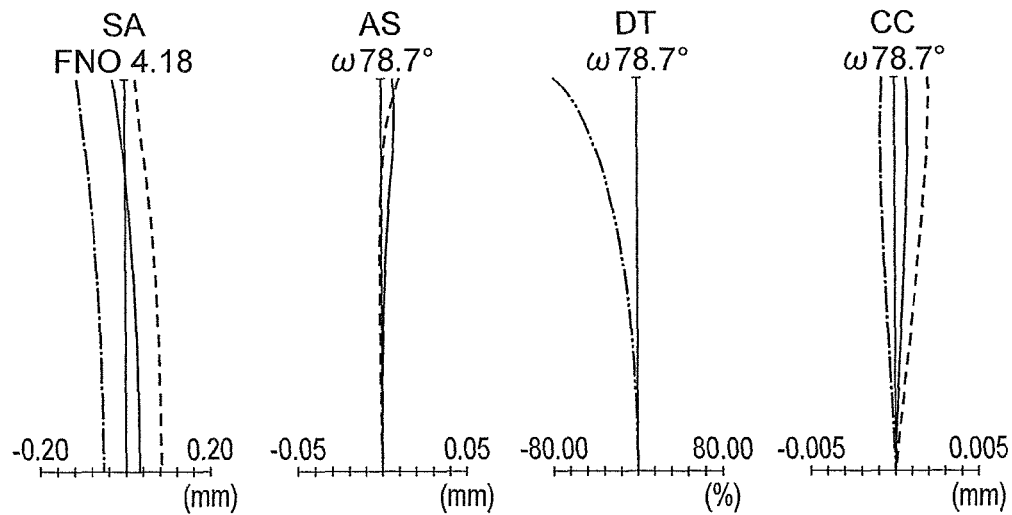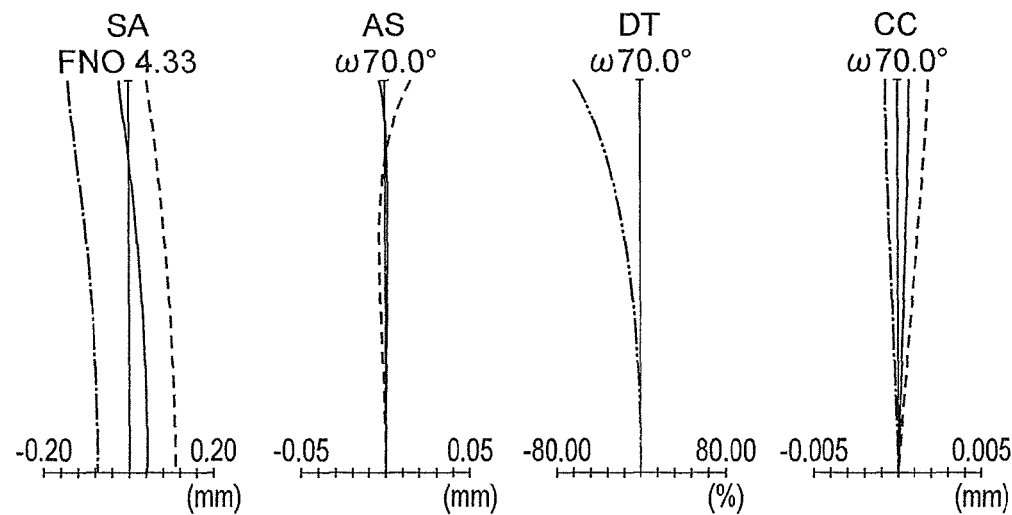

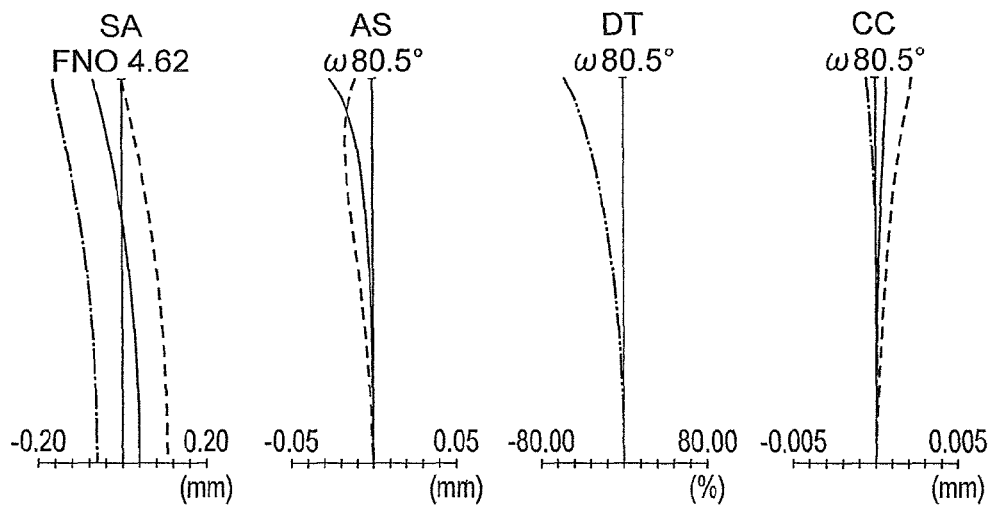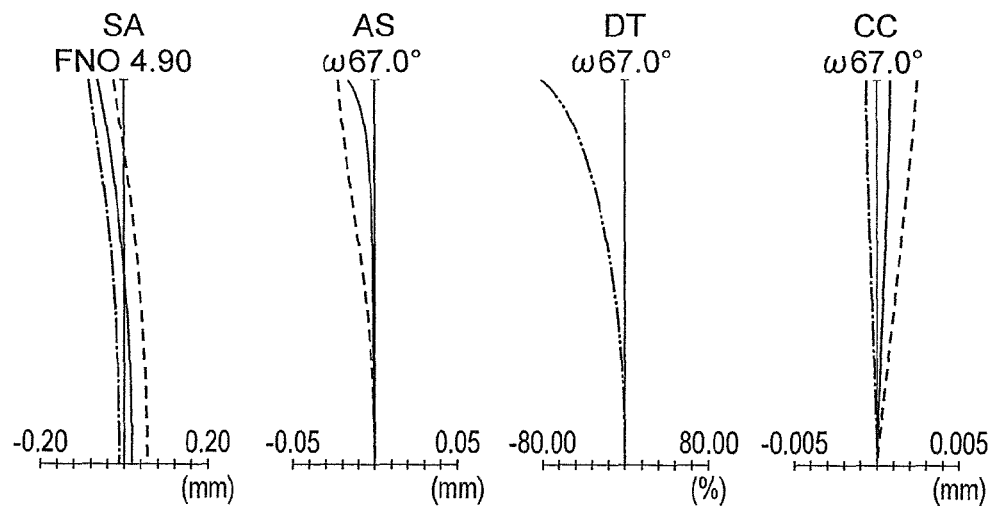

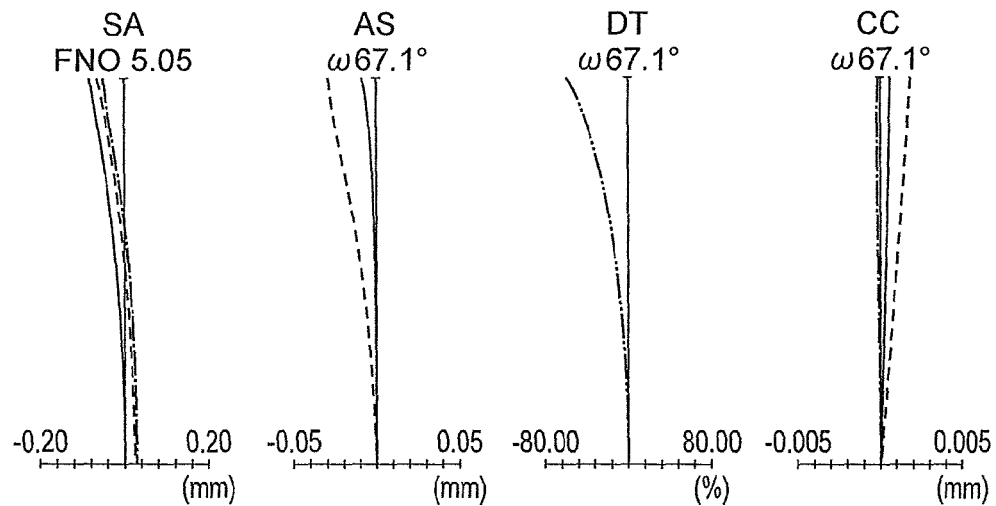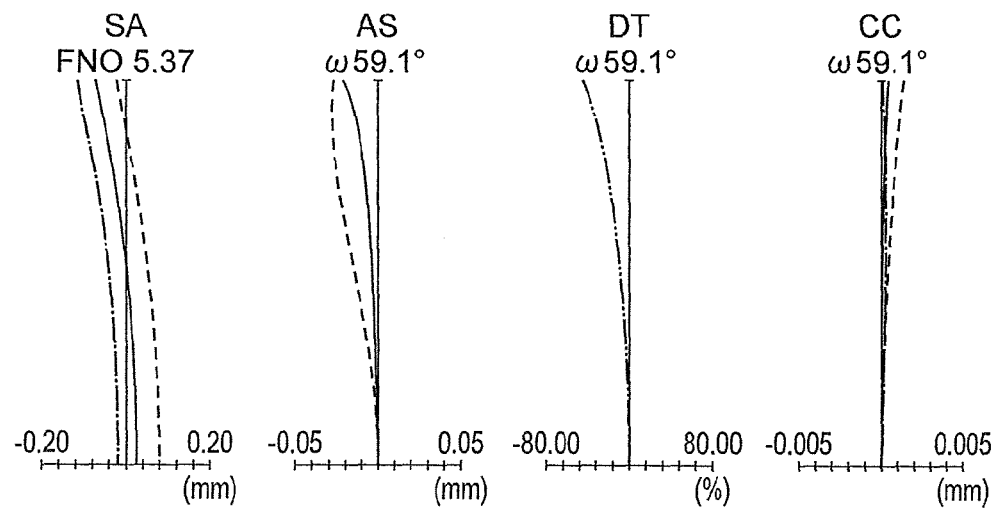

OBJECTIVE OPTICAL SYSTEM

CROSS-REFERENCE TO RELATED APPLICATION

The present application is a continuation application of PCT/JP2015/068619 filed on Jun. 29, 2015 which is based upon and claims the benefit of priority from Japanese Patent Application No. 2014-143112 filed on Jul. 11, 2014; the entire contents of which are incorporated herein by reference.

BACKGROUND OF THE INVENTION

Field of the Invention

The present invention relates to an objective optical system which has a focusing function, and particularly, to an objective lens for endoscope which enables a close observation, and to a taking lens of other small-size cameras for consumer use.

Description of the Related Art

A normal objective lens for endoscope has a depth of field of a wide range from about 5 mm to 100 mm on an object side. In an endoscope equipped with such objective lens for endoscope, an image is provided mainly by using a solid image pickup element such as a CCD (charge coupled device).

In recent years, for improving an accuracy of diagnosis, an improvement in a quality of an endoscope image has been sought. In order to fulfil such requirement, in an endoscope, increasing the number of pixels of CCD, or in other words, making the number of pixels of CCD large has been progressing. However, in an endoscope in which a CCD with a large number of pixels is used, the depth of field becomes narrow as compared to that in a conventional endoscope. Main reasons for the narrowing of the depth of field are that there is a need to make small an Fno (F-number) of an objective lens for endoscope in order to avoid degradation of image quality due to diffraction of light, and that it is necessary to make a focal length of the objective lens for endoscope long as the CCD becomes large due to an effect of making the number of pixels large.

In this case, for securing the depth of field of a same level as in the conventional endoscope, a focusing function is to be imparted to the objective lens for endoscope. For such reasons, there is an increased need of objective lenses for endoscope having the focusing function.

It is desired that the objective lens for endoscope having the focusing function can be used similarly as the conventional objective lens for endoscope. Therefore, in the objective lens for endoscope having the focusing function, it is required that an angle of view of observation does not change when focused.

As an objective lens having the focusing function and a small fluctuation in the angle of view, objective lenses (objective optical systems) disclosed in Japanese Patent Publication after Examination No. Sho 55-015005, Japanese Patent Application Laid-open Publication No. 2000-330015, Japanese Patent Application Laid-open Publication No. 2002-28126, and Japanese Patent Publication No. 4819969 are available. The objective lens in Japanese Patent Publication after Examination No. Sho 55-015005 includes two units having a refractive power in order of a negative refractive power and a positive refractive power, and the objective lens in Japanese Patent Publication No. 4819969 includes three units having a refractive power in order of a negative refractive power, a positive refractive power and a positive refractive power. In both the objective lenses, the focusing is carried out by moving a second unit. Moreover, in Japanese Patent Application Laid-open Publication No. 2000-330015 and Japanese Patent Application Laid-open Publication No. 2002-28126, an objective lens including two units having a refractive power in order of a positive refractive power and a positive refractive power, has been disclosed.

In addition, as an objective lens for magnifying endoscope which enables to carryout focusing to an object point at a closer distance, objective lenses disclosed in Japanese Patent Publication after Examination No. Sho 61-044283, Japanese Patent Application Laid-open Publication No. Hei 06-317744, and Japanese Patent Application Laid-open Publication No. Hei 11-316339 are available. These objective lenses for magnifying endoscope includes three units having a refractive power in order of a positive refractive power, a negative refractive power, and a positive refractive power, and the focusing is carried out by moving a second unit having a negative refractive power. Moreover, in Japanese Patent Application Laid-open Publication No. 2000-267002, an optical system which includes three units having a refractive power in order of a negative refractive power, a positive refractive power, and a negative refractive power, and in which the focusing is carried out by moving a second unit having a positive refractive power, has been disclosed.

SUMMARY OF THE INVENTION

The present invention provides the following means.

An objective optical system according to an aspect of the present invention includes in order from an object side, a first unit having a positive refractive power, a second unit having a negative refractive power, and a third unit having a positive refractive power, wherein focusing is carried out by moving the second unit, and the first unit and the third unit are fixed at the time of focusing, and the first unit includes in order from the object side, a negative lens, one of a positive lens and a cemented lens, and a positive lens, and the third unit includes a positive lens, and a cemented lens of a positive lens and a negative lens, and the objective optical system satisfies the following conditional expression (3)

$$-20 < f_2/f < -5 \quad (3)$$

where, $f_2$ denotes a focal length of the second unit, and f denotes a focal length of the overall objective optical system in a normal observation state.

Moreover, another aspect of the present invention includes in order from an object side, a first unit having a positive refractive power, a second unit having a negative refractive power, and a third unit having a positive refractive power, wherein the second unit includes a meniscus lens having a convex surface directed toward the object side, and focusing is carried out by moving the second unit on an optical axis, and the first unit and the third unit are fixed at the time of focusing, and the objective optical system satisfies the following conditional expressions (1), (2), and (3)

$$0.12 < d_{2g}/f < 1.02 \quad (1)$$

$$1.8 < f_1/f < 4.2 \quad (2)$$

$$-20 < f_2/f < -5 \quad (3)$$

where, $d_{2g}$ denotes an amount of movement of the second unit, and f denotes a focal length of the overall objective optical system in a normal observation state.

f1 denotes a focal length of the first unit, and f2 denotes a focal length of the second unit.

BRIEF DESCRIPTION OF THE DRAWINGS

FIG. 2A is cross-sectional view in a normal observation state, and FIG. 2B is a cross-sectional view in a close observation state;

FIG. 3A, FIG. 3B, FIG. 3C, FIG. 3D, FIG. 3E, FIG. 3F, FIG. 3G, and FIG. 3H are aberrations diagrams showing a spherical aberration (SA), an astigmatism (AS), a distortion (DT), and a chromatic aberration of magnification (CC) respectively, of the example 1;

FIG. 4A is a cross-sectional view in a normal observation state, and FIG. 4B is a cross-sectional view in a close observation state;

FIG. 5A, FIG. 5B, FIG. 5C, FIG. 5D, FIG. 5E, FIG. 5F, FIG. 5G, and FIG. 5H are aberration diagrams showing a spherical aberration (SA), an astigmatism (AS), a distortion (DT), and a chromatic aberration of magnification (CC) respectively, of the example 2;

FIG. 6A is a cross-sectional view in a normal observation state, and FIG. 6B is a cross-sectional view in a close observation state;

FIG. 7A, FIG. 7B, FIG. 7C, FIG. 7D, FIG. 7E, FIG. 7F, FIG. 7G, and FIG. 7H are aberration diagrams showing a spherical aberration (SA), an astigmatism (AS), a distortion (DT), and a chromatic aberration of magnification (CC) respectively, of the example 3;

FIG. 8A is a cross-sectional view in a normal observation state, and FIG. 8B is a cross-sectional view in a close observation state;

FIG. 9A, FIG. 9B, FIG. 9C, FIG. 9D, FIG. 9E, FIG. 9F, FIG. 9G, and FIG. 9H are aberration diagrams showing a spherical aberration (SA), an astigmatism (AS), a distortion (DT), and a chromatic aberration of magnification (CC) respectively, of the example 4;

FIG. 10A is a cross-sectional view in a normal observation state, and FIG. 10B is a cross-sectional view in a close observation state; and FIG. 11A, FIG. 11B, FIG. 11C, FIG. 11D, FIG. 11E, FIG. 11F, FIG. 11G, and FIG. 11H are aberration diagrams showing a spherical aberration (SA), an astigmatism (AS), a distortion (DT), and a chromatic aberration of magnification (CC) respectively, of the example 5.

DETAILED DESCRIPTION OF THE INVENTION

Objective optical systems according to embodiments of the present invention will be described below by using the accompanying diagrams and explaining reasons for and effects of such arrangements. However, the present invention should not be construed as being limited by the embodiments described below.

Figure 1A:
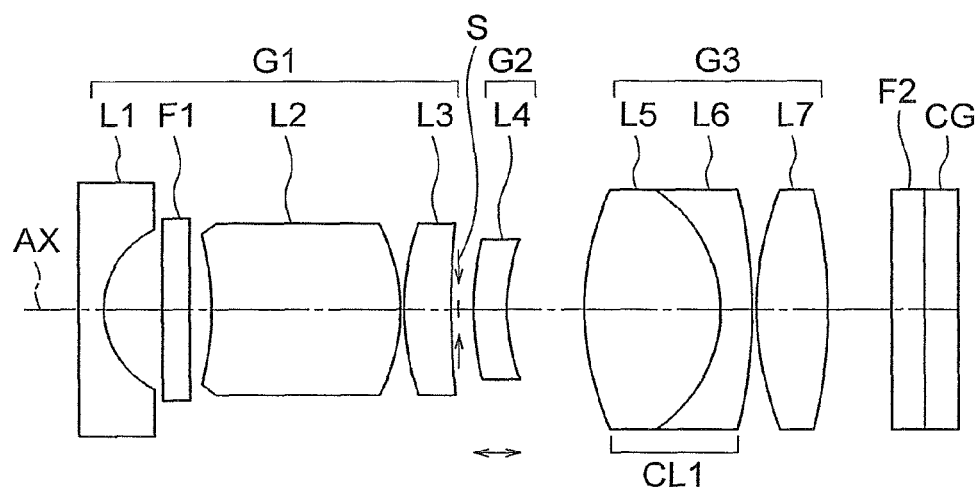
FIG. 1A and FIG. 1B are diagrams showing a cross-sectional arrangement of an objective optical system according to an embodiment of the present invention.
Figure 1B:
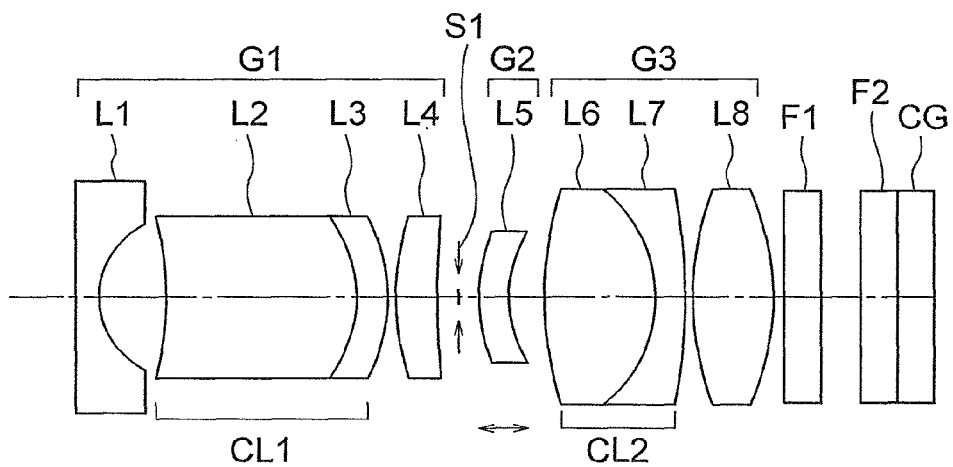

The objective optical systems according to the embodiments include in order from an object side, a first unit having a positive refractive power, a second unit having a negative refractive power, and a third unit having a positive refractive power. FIG. 1A and FIG. 18 are cross-sectional views showing an overall arrangement of an objective optical system according to a first embodiment and an objective optical system according to a second embodiment. As shown in FIG. 1A and FIG. 1B, the objective optical system includes in order from the object side, a first unit G1 having a positive power (refractive power), an aperture stop S, a second unit G2 having a negative power, and a third unit G3 having a positive power.

In the objective optical system according to the first embodiment, focusing is carried out by moving the second unit G2, and the first unit G1 includes in order from the object side, a negative lens, one of a positive lens and a cemented lens, and a positive lens, and the third unit G3 includes a positive lens, and a cemented lens of a positive lens and a negative lens.

Specifically, as shown in FIG. 1A, the first unit G1 having a positive refractive power includes in order from the object side, a first lens L1 having a negative refractive power, a second lens L2 having a positive refractive power, and a third lens L3 having a positive refractive power. Moreover, focusing is carried out by moving the second unit G2. The third unit G3, as shown in FIG. 1A, includes in order from the object side, a fifth lens L5 having a positive refractive power, a sixth lens L6 having a negative refractive power, and a seventh lens L7 having a positive refractive power. The fifth lens L5 having a positive refractive power and the sixth lens L6 having a negative refractive power are cemented, and form a cemented lens CL1.

Whereas, in FIG. 1B, the first unit G1 having a positive refractive power includes in order from the object side, a first lens L1 having a negative refractive power, a cemented lens CL1, and a fourth lens L4 having a positive refractive power. The second lens L2 having positive refractive power and the third lens L3 having a negative refractive power are cemented, and form a cemented lens CL1. Moreover, focusing is carried out by moving the second unit G2. In FIG. 1B, the third unit G3 having a positive refractive power includes in order from the object side, a sixth lens L6 having a positive refractive power, a seventh lens L7 having a negative refractive power, and an eighth lens L8 having a positive refractive power. The sixth lens L6 having a positive refractive power and the seventh lens L7 having a negative refractive power are cemented, and form a cemented lens CL2.

Next, in the objective optical system according the second embodiment, the second unit G2 includes a meniscus lens having a convex surface directed toward the object side, and focusing is carried out by moving the second unit G2 on the optical axis, and the objective optical system satisfies conditional expression (1).

As shown in FIG. 1A, the second unit G2 includes a meniscus lens L4 having a convex surface directed toward the object side. Moreover, focusing is carried out by moving the meniscus lens L4 on the optical axis. Whereas in FIG. 1B, the second unit G2 includes a meniscus lens L5 having a convex surface directed toward the object side. Moreover, focusing is carried out by moving the meniscus lens L5 on the optical axis.

Moreover, the objective optical system satisfies the following conditional expression (1).

$$0.12 < d_{2g}/f < 1.02 \qquad (1)$$

where, $d_{2g}$ denotes an amount of movement of the second unit, and f denotes a focal length of the overall objective optical system in a normal observation state.

When an upper limit value of conditional expression (1) is exceeded, an amount of movement of the second unit G2 becomes excessively large. In this case, since the overall length of the optical system becomes long, it is not desirable.

It is desirable to satisfy the following conditional expression (1') instead of conditional expression (1).

$$0.22 < d_{2g}/f < 0.94 \qquad (1')$$

By satisfying conditional expression (1'), it is possible to achieve further reduction in error sensitivity, and small-sizing of the optical system.

The objective optical system according to the first embodiment and the objective optical system according to the second embodiment (hereinafter, referred to as 'the objective optical system according to the present embodiment') can be arranged as described below.

As shown in FIG. 1A and FIG. 1B, the aperture stop S is disposed between the first unit G1 and the second unit G2.

Moreover, as shown in FIG. 1A, a first plane-parallel plate F1 is disposed between the first lens L1 having a negative refractive power and the second lens L2 having a positive refractive power. Whereas, in FIG. 1B, the first plane-parallel plate F1 is disposed on an image side of the third unit G3. Thus, the plane-parallel plate F1 can be disposed at an arbitrary position in the objective optical system.

Moreover, an image pickup element, which is not shown in the diagram, may be disposed near an image plane in the objective optical system, and an objective optical system and an image pickup optical system may be formed. A plane-parallel plate F2 and a cover glass CG are stuck to the image pickup element, for protecting an image pickup surface.

As shown in FIG. 1A, the second unit G2 includes a fourth lens L4 having a negative refractive power. The fourth lens L4 having a negative refractive power is a negative meniscus lens having a convex surface directed toward the object side. In FIG. 1B, the second unit G2 includes a fifth lens L5 having a negative refractive power.

From a time of normal observation up to a time of close observation, while focusing (adjusting the focus) with the fluctuation in a position of an object point, it is necessary to carry out focusing by moving at least one unit.

Any unit from among the plurality of units in the objective optical system may be moved for focusing. Moreover, one or a plurality of units may be moved. Here, when only one unit is movable, an effect that a mechanical structure can be simplified is shown.

As mentioned above, in the objective optical system of the present embodiment, the focusing is carried out by moving the second unit G2. As shown in FIG. 1A, at the time of focusing, the fourth lens L4 having a negative refractive power is moved along an optical axis AX. Moreover, in FIG. 1B, the fifth lens L5 having a negative refractive power moves along the optical axis AX.

A method in which the overall objective optical system or the image pickup element is to be moved for focusing is also available. However, in this method, a weight of a lens unit to be moved, or the image pickup element becomes heavy. Consequently, a load on a drive mechanism becomes large, and it is also necessary to make the drive mechanism large-size, and therefore it is not preferable.

Moreover, it is desirable that the objective optical system according to the present embodiment satisfies the following conditional expression (2).

$$1.8 < f_1/f < 4.2 \qquad (2)$$

where, f denotes the focal length of the overall optical system in the normal observation state, and $f_1$ denotes a focal length of the first unit.

Conditional expression (2) regulates a condition that contributes to small-sizing and superior performance of the objective optical system.

When a value falls below a lower limit value of conditional expression (2), the power of the first unit G1 becomes large. Consequently, it is advantageous for small-sizing of the optical system, but since a spherical aberration becomes under (inadequate correction), it is not preferable. Moreover, when an upper limit value of conditional expression (2) is exceeded, the overall length of the optical system becomes long. In this case, since small-sizing of the optical system becomes difficult, it is not desirable.

Moreover, it is desirable that the objective optical system according to the present embodiment satisfies the following conditional expression (3).

$$-20 < f_2/f < -5 \qquad (3)$$

where, f denotes the focal length of the overall objective optical system in the normal observation state, and $f_2$ denotes a focal length of the second unit.

Conditional expression (3), which is a conditional expression that sets appropriately the power of the second unit G2, suppresses an image plane fluctuation at the time of focusing, and regulates a condition that contributes to the small-sizing of the optical system.

When a value falls below a lower limit value of conditional expression (3), the power of the second unit G2 becomes small. In this case, rice an amount of movement of the second unit G2 becomes excessively large, it leads to a large size of the optical system. Moreover, when an upper limit value of conditional expression (3) is exceeded, a fluctuation in a curvature of field due to focusing becomes large. Accordingly, since there is a remarkable difference in a position of the image plane at the time of normal observation and a position of the image plane at the time of close observation, it is not preferable.

Moreover, it is desirable that the objective optical system according to the present embodiment satisfies the following conditional expression (4).

$$2 < f_3/f < 5 \qquad (4)$$

where, f denotes the focal length of the overall objective optical system in the normal observation state, and $f_3$ denotes a focal length of the third unit.

Conditional expression (4) regulates a condition that contributes to correction of the curvature of field.

When a value falls below a lower limit value of conditional expression (4), the image plane is inclined toward an under-side. When an upper limit value of conditional expression (4) is exceeded, the image plane is inclined toward an over-side. Thus, if the objective optical system does not satisfy conditional expression (4), an image is such that, the focus is not adjusted at a central portion and a peripheral portion of image field, and therefore it is not preferable.

It is desirable that the objective optical system satisfies the following conditional expression (4') instead of conditional expression (4).

$$2.7 < f_3/f < 5 \quad (4')$$

Basically, the image plane of the peripheral portion tends to be inclined toward the under-side at a position of near-points at the time of normal observation and at the time of close observation respectively. Here, by satisfying conditional expression (4'), since it is possible to achieve an image with lesser curvature of field even at any object-point position, it is desirable.

Moreover, it is desirable that the objective optical system according to the present embodiment satisfies the following conditional expression (5).

$$0.85 < f_n/f < 1.15 \quad (5)$$

where, f denotes the focal length of the overall objective optical system in the normal observation state, and $f_n$ denotes a focal length of the overall objective optical system in the close observation state.

The objective optical system according to the present embodiment is equipped with a focusing mechanism. In such objective optical system, it is preferable that a change in an angle of view and a change in magnification are small when focused, such that an observation image is not affected. Therefore, by satisfying conditional expression (5), it is possible to make small a change in the focal length at the time of focusing.

Within the range in which conditional expression (5) is satisfied, the change in the angle of view at the time of focusing becomes small. Whereas, when the range of conditional expression (5) is surpassed, since the change in the angle of view becomes large, it is not preferable.

When a value falls below a lower limit value of conditional expression (5), a depth of focus in the normal observation state becomes shallow. Consequently, since the usability is degraded at the time of observation such as screening, it is not preferable. Moreover, when the object-point becomes closer, the depth of field becomes shallow accordingly. When, an upper limit value of conditional expression (5) is exceeded, since the depth of field at the time of close-distance observation becomes excessively shallow, it is not preferable.

It is desirable that the objective optical system satisfies the following conditional expression (5') instead of conditional expression (5).

$$0.95 < f_n/f < 1.1 \quad (5')$$

When the objective optical system satisfies conditional expression (5'), an effect that the change in the angle of view at the time of focusing becomes small is enhanced further.

Moreover, it is desirable that that the objective optical system according to the present embodiment satisfies the following conditional expression (6).

$$1.6 < D_2/f < 3.8 \quad (6)$$

where, f denotes the focal length of the overall objective optical system in the normal observation state, and $D_2$ denotes a lens thickness of the second lens.

By satisfying conditional expression (6), it is possible to correct an astigmatism and the curvature of field favorably.

When a value falls below a lower limit value of conditional expression (6), since a meridional image plane is inclined substantially toward the under-side, and the astigmatism becomes large, it is not preferable. When an upper limit value of conditional expression (6) is exceeded, since the curvature of field becomes large, it is not preferable.

It is desirable that the objective optical system satisfies the following conditional expression (6') instead of conditional expression (6).

$$2.2 < D_2/f < 3.2 \quad (6')$$

By satisfying conditional expression (6'), it is possible to suppress the astigmatism and the curvature of field to be the minimum.

Moreover, it is desirable that the objective optical system according to the present embodiment satisfies the following conditional expression (7).

$$1.2 < f_{3t}/f_{3p} < 3.6 \quad (7)$$

where, $f_{3t}$ denotes a focal length of a positive single lens in the third unit, and $f_{3p}$ denotes a focal length of a positive lens in the cemented lens of the third unit.

As mentioned above, the third unit G3 includes the positive lens, and the cemented lens of the positive lens and the negative lens. The positive single lens contributes mainly to the correction of the curvature of field. Moreover, by including the cemented lens, it is possible to correct a chromatic aberration favorably.

When a value falls below a lower limit value of conditional expression (7), the focal length of the positive single lens in the third unit G3 becomes small. Consequently, a back-focus cannot be secured, and furthermore, the curvature of field becomes large at the under-side.

When an upper limit value of conditional expression (7) is exceeded, the power of the cemented lens becomes small. Consequently, correction of chromatic aberration for a C-line (wavelength 656.3 nm) and an F-line (wavelength 486.1 nm) cannot be carried out adequately. Accordingly, a longitudinal chromatic aberration and a chromatic aberration of magnification are also worsened.

It is desirable that the objective optical system satisfies the following conditional expression (7') instead of conditional expression (7).

$$1.6 < f_{3t}/f_{3p} < 3.2 \quad (7')$$

By setting limits as in conditional expression (7'), it is possible to carry out the correction of the chromatic aberration and the curvature of field in a balanced manner.

Moreover, it desirable that the objective optical system according to the present embodiment includes a first lens which is disposed nearest to an object, and a rearmost lens which is disposed nearest to an image, and satisfies the following conditional expressions (9) and (10).

$$0.74 < f_{ob}/f < 1.12 \quad (9)$$

$$1.02 < f_{mh}/f < 1.58 \quad (10)$$

where, f denotes a focal length of the overall objective optical system in the normal observation state, $f_{th}$ denotes the maximum height of a diagonal principal light ray at an image-side surface of the rearmost lens, and $f_{mh}$ denotes the maximum height of a diagonal principal light ray at an object-side surface of the first lens.

Conditional expressions (9) and (10) are conditional expressions for small-sizing the optical system. By satisfying at least any one of conditional expressions (9) and (10), not only that small-sizing of a lens diameter is fulfilled, but also it is advantageous from a viewpoint of optical performance.

When a value falls below a lower limit value of conditional expression (9), a height of a light ray becomes small. Consequently, it is possible to achieve small-sizing of the optical system. However, an angle of oblique incidence on an image pickup surface becomes large. As a result, since degradation of a light amount of peripheral area becomes large, it is not preferable. When an upper limit value of conditional expression (9) is exceeded, the height of a light ray becomes high. As a result, since this leads to a large lens diameter, it is not preferable.

When a value falls below a lower limit value of conditional expression (10), the height of a light ray becomes small, Consequently, it is possible to achieve small-sizing. However, a position of incidence of an off-axis light ray on a first surface is toward the optical axis AX. Therefore, it is necessary to dispose a position of an entrance pupil rather anterior to a lens system. This is unfavorable for an optical system of an endoscope which is required to have a wide angle. When an upper limit value of conditional expression (10) is exceeded, the height of a light ray becomes high. As a result the lens diameter becomes large, and therefore it is not preferable.

Moreover, it is desirable that the objective optical system according to the present embodiment satisfies the following conditional expression (11).

$$0.1 < |r_a - r_b|/|r_a + r_b| < 0.4 \qquad (11)$$

where, $r_a$ denotes a radius of curvature of a surface nearest to an object of the second unit, and $r_b$ denotes a radius of curvature of surface nearest to an image of the second unit.

As mentioned above, the second unit G2 includes the meniscus lens of a shape having the convex surface directed toward the object side. By satisfying conditional expression (11), it is possible to realize small-sizing of the optical system, while securing appropriately a space for lens movement at the time of focusing.

When a value falls below a lower limit value of conditional expression (11), the power of lenses in the second unit G2 becomes excessively small. Consequently, the amount of lens-movement in the second unit G2 at the time of focusing becomes large, and also the overall length of the optical system becomes long. This is not preferable as it becomes a cause of making the size large.

When an upper limit value of conditional expression (11) is exceeded, the shape of lenses in the second unit G2 changes from the meniscus shape to a planoconvex shape. Consequently, a principal point of the second unit G2 is positioned relatively anteriorly. Accordingly, it becomes difficult to secure appropriately a space for the lens movement at the time of focusing.

Moreover, it is desirable that the objective optical system according to the present embodiment includes a first lens which is disposed nearest to the object, and satisfies the following conditional expression (12).

$$-2.2 < f_{11}/f < -0.8 \qquad (12)$$

where, $f_{11}$ denotes a focal length of the first lens, and f denotes the focal length of the overall objective optical system in the normal observation state.

By satisfying conditional expression (12), it is possible to carry out correction of the curvature of field appropriately. Furthermore, by satisfying conditional expression (12), since it is possible to secure an appropriate angle of field, it is desirable.

When a value falls below a lower limit value of conditional expression (12), since the image plane is inclined toward the under-side, it is not preferable. When an upper limit value of conditional expression (12) is exceeded, since the image plane is inclined toward the over-side, it is not preferable. Moreover, when the value falls below the lower limit value of conditional expression (12), distortion is corrected excessively. Consequently, the angle of field becomes narrow, and it is not favorable for screening etc.

It is desirable that the objective optical system according to the present embodiment satisfies the following conditional expression (12') instead of conditional expression (12).

$$-1.8 < f_{11}/f < -1.2 \qquad (12')$$

Moreover, it is desirable that the objective optical system according to the present embodiment satisfies the following conditional expressions (13-1) and (13-2) simultaneously.

$$\omega_f > 60° \qquad (13\text{-}1)$$

$$\omega_n > 50° \qquad (13\text{-}2)$$

where, $\omega_f$ denotes a half angle of view in the normal observation state of the objective optical system, and $\omega_n$ denotes a half angle of view in the close observation state of the objective optical system.

In order to reduce overlooking of a site of lesion at the time of screening inside of organism, it is desirable that the objective optical system according to the present embodiment is as wide-angle optical system as possible. In the normal observation state, the angle of field of at least 120° or more is desired in an area of all object points. Furthermore, securing a wide field is essential even at the time of close observation. Therefore, it is desirable that the angle of field is 100° or more.

By satisfying conditional expressions (13-1) and (13-2) simultaneously, it is possible to secure a site of lesion more assuredly at the time of screening inside of organism.

Moreover, it is desirable that the objective optical system according the present embodiment satisfies the following conditional expression (14).

$$0.8 < f_{23f}/f_{23n} < 1.2 \qquad (14)$$

where, $f_{23f}$ denotes a combined focal length of the second unit and the third unit in the normal observation state, and $f_{23n}$ denotes a combined focal length of the second unit and the third unit in the close observation state.

In the objective optical system of the present embodiment, the aperture stop S is disposed on the image side of the first unit G1. When the objective optical system satisfies conditional expression (14), even if a position of the aperture stop S is fixed and a lens unit on the image side of the aperture stop S is movable, a position of an exit pupil remain almost unchanged. Therefore, it is possible to maintain an angle of incidence of a light ray incident on the image pickup element to be constant. As a result, it is possible to realize an optical system which has no effect of shading even at the time of focusing.

Moreover, by satisfying conditional expression (14) with an arrangement of the aperture stop S positioned on the image side of the first unit G1, it is possible to suppress fluctuation in an F-number to be the minimum at any object-point position. Accordingly, it is possible to maintain the depth of field deep to some extent.

When a value falls below a lower limit value of conditional expression (14), in the normal observation state, the combined focal length of the second unit G2 and the third unit G3 becomes small. In this case, since an angle of oblique incidence on an image pickup surface becomes large, the loss of the amount of light on the image pickup element becomes large. Furthermore, it becomes difficult to secure appropriately a back-focus in the overall objective optical system.

When an upper limit value of conditional expression (14) is exceeded, the combined focal length of the second unit G2 and the third unit G3 in the normal observation state becomes small. In this case, since a fluctuation of a light amount of peripheral area becomes large due to switching between the normal observation state and the close observation state, it is not preferable.

It is desirable that the objective optical system satisfies the following conditional expression (14') instead of conditional expression (14).

$$0.9 < f_{23}/f_{23n} < 1.0 \quad (14')$$

By satisfying conditional expression (14'), it is possible to realize an optical system which, all the more, has no effect of shading even at the time of focusing.

Moreover, it is desirable that the objective optical system according to the present embodiment satisfies the following conditional expression (15).

$$-8 < f_2/f_3 - 2 \quad (15)$$

where,
$f_2$ denotes the focal length of the second unit, and
$f_3$ denotes the focal length of the third unit.

Conditional expression (9) regulates a condition related to appropriate correction of the curvature of field.

When a value fails below a lower limit value of conditional expression (15), the image plane is largely inclined toward a minus-side. When an upper limit value of conditional expression (15) is exceeded, since the image plane is largely inclined toward a plus-side, it is not preferable.

Moreover, it is desirable that the objective optical system according to the present embodiment satisfies the following conditional expression (16).

$$-8.2 < f_2/f_1 < -2.8 \quad (16)$$

where,
$f_1$ denotes the focal length of the first unit, and
$f_2$ denotes the focal length of the second unit.

Conditional expression (16) regulates a condition related to appropriate correction of the spherical aberration and the longitudinal chromatic aberration.

When a value falls below a lower limit value of conditional expression (16), there is an excessive correction of the spherical aberration. Moreover, since the longitudinal chromatic aberration becomes large on the minus-side about a C-line and on the plus-side about an F-line, it is not preferable. When an upper limit value of conditional expression (16) is exceeded, correction of the spherical aberration is inadequate. Moreover, since the longitudinal chromatic aberration becomes large on the plus-side about the C-line and on the minus-side about the F-line, it is not preferable.

An image pickup apparatus according to the present embodiment includes the abovementioned objective optical lens, and an image pickup element, and satisfies the following conditional expression (8).

$$1.2 < (Fno) \times (f)/(p \times 1000) < 3.2 \quad (8)$$

where,
f denotes the focal length of the overall objective optical system in the normal observation state,
Fno denotes the F-number in the normal observation state, and
P denotes a pixel pitch of the image pickup element.

When a value falls below a lower limit value of conditional expression (8), the pixel pitch of the image pickup element becomes large and the number of pixels becomes small. Consequently, even if an objective optical system with an a superior performance is realized, a highly-defined image cannot be achieved.

When an upper limit value of conditional expression (8) is exceeded, small pixel pitch and highly-defined image pickup element can be facilitated. Here, when the superior performance of the objective optical system is facilitated in order to deal with such image pickup element, the optical system, in addition to becoming large-sized, also becomes weak to the error sensitivity, or in other words, the optical performance is susceptible to be degraded with respect to the same manufacturing variability.

EXAMPLE 1

An objective optical system according to an example 1 will be described below.

Figure 2A:
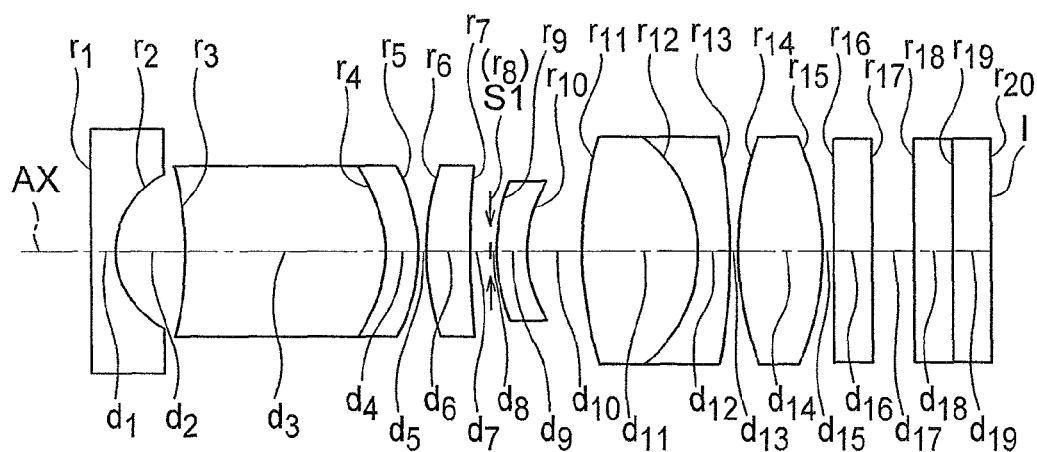
FIG. 2A and FIG. 2B are diagrams showing a cross-sectional arrangement of an objective optical system according to an example 1 of the present invention, where.
Figure 2B:
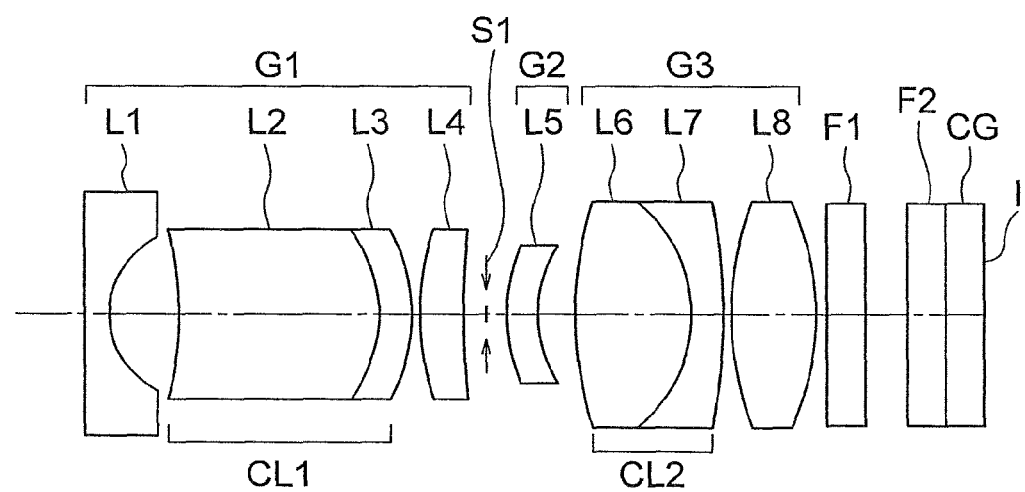

FIG. 2A is a cross-sectional view of the objective optical system according to the present example in a normal observation state (object point at a long distance), and FIG. 2B is a cross-sectional view of the objective optical system according to the present example in a close observation state (object point at a short distance).

As shown in FIG. 2A and FIG. 2B, the objective optical system includes in order from an object side, a first unit G1 having a positive refractive power, an aperture stop S1, a second unit G2 having a negative refractive power, and a third unit G3 having a positive refractive power.

The first unit G1 having a positive refractive power includes in order from the object side, a first lens L1 having a negative refractive power which is a planoconcave lens, a second meniscus lens L2 having a positive refractive power of which a convex surface is directed toward an image side, a third meniscus lens L3 having a negative refractive power of which a convex surface is directed toward the image side, and a fourth meniscus lens L4 having a positive refractive power of which a convex surface is directed toward the object side. The second meniscus lens L2 having a positive refractive power and the third meniscus lens L3 having a negative refractive power are cemented, and form a cemented lens CL1. The aperture stop S1 is disposed posterior to (at an image-plane I side) of the first unit G1.

The second unit G2 having a negative refractive power includes a fifth meniscus lens L5 having a negative refractive power of which a convex surface is directed toward the object side. The fifth meniscus lens L5 having a negative refractive power moves toward the image side (image plane I) along an optical axis AX at the time of focusing from the normal observation state (FIG. 2A) to the close observation state (FIG. 2B).

The third unit G3 having a positive refractive power includes a sixth meniscus lens L6 having positive refractive power which is a biconvex lens, a seventh meniscus lens L7 having a negative refractive power of which a convex surface is directed toward the image side, and an eighth lens L8 having a positive refractive power which is a biconvex lens. The sixth meniscus lens L6 having a positive refractive power and the seventh meniscus lens L7 having a negative refractive power are cemented, and form a cemented lens CL2.

A plane parallel plate F1 is disposed posterior to (at an image-plane I side) the third unit G3, and a cover glass CG is stuck to a front surface of an image pickup element which is not shown in the diagrams. In the present example, a plane parallel plate F2 is cemented to an entire surface of the cover glass CG.

The plane parallel plates F1 and F2 are filters to which a coating to cut off specific wavelengths such as 1060 nm of a YAG (Yttrium Aluminum Garnet) laser and 810 nm of a semiconductor laser, or an infrared region, has been applied.

FIG. 3A, FIG. 3B, FIG. 3C, and FIG. 3D show a spherical aberration (SA), an astigmatism (AS), a distortion (DT), and a chromatic aberration of magnification (CC) in the normal observation state of the present example.

FIG. 3E, FIG. 3F, FIG. 3G, and FIG. 3H show a spherical aberration (SA), an astigmatism (AS), a distortion (DT), and a chromatic aberration of magnification (CC) in the close observation state of the present example.

The aberration diagrams are for wavelengths of 656.3 nm (C-line), 486.1 nm (F-line), and 546.1 nm (e-line). Moreover, in each diagram, "ω" denotes a half angle of view. In the following description, similar reference numerals will be used for aberration diagrams.

EXAMPLE 2

An objective optical system according to an example 2 will be described below.

Figure 4A:
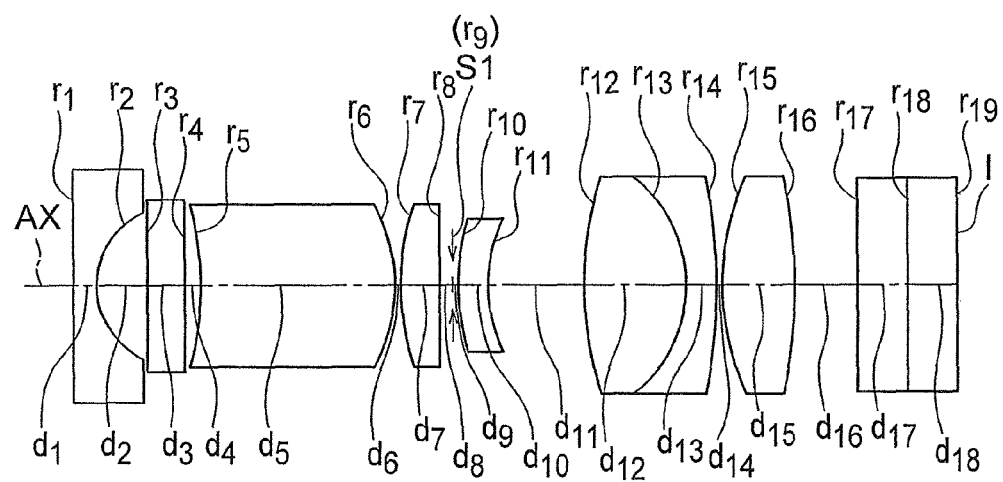
FIG. 4A and FIG. 4B are diagrams showing a cross-sectional arrangement of an objective optical system according to an example 2 of the present invention, where.
Figure 4B:
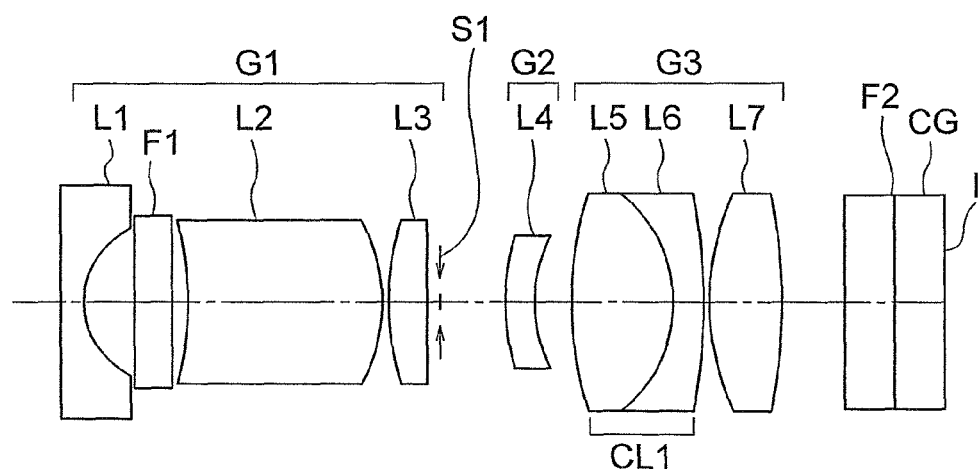

FIG. 4A is a cross-sectional view of the objective optical system according to the present example in a normal observation state (object point at a long distance), and FIG. 4B is a cross-sectional view of the objective optical system according the present example in a close observation state (object point at a short distance).

As shown in FIG. 4A and FIG. 4B, the objective optical system includes in order from an object side, a first unit G1 having a positive refractive power, an aperture stop S1, a second unit G2 having a negative refractive power, and a third unit G3 having a positive refractive power.

The first unit G1 having a positive refractive power includes in order from the object side, a first lens L1 having a negative refractive power which is a planoconcave lens, a plane parallel plate F1, a second meniscus lens L2 having a positive refractive power of which a convex surface is directed toward an image side, and a third lens L3 having a positive refractive power which is a biconvex lens. The aperture stop S1 is disposed posterior (at an image-plane I side) of the first unit G1.

The second unit G2 having a negative refractive power includes a fourth meniscus lens L4 having a negative refractive power of which a convex surface is directed toward the object side. The fourth meniscus lens L4 having a negative refractive power moves toward the image side (image plane I) along an optical axis AX at the time of focusing from the normal observation state (FIG. 4A) to the close observation state (FIG. 4B).

The third unit G3 having a positive refractive power includes a fifth lens L5 having a positive refractive power which is a biconvex lens, a sixth meniscus lens L6 having a negative refractive power of which a convex surface is directed toward the image side, and a seventh lens L7 having a positive refractive power which is a biconvex lens. The fifth lens L5 having a positive refractive power and the sixth meniscus lens L6 having a negative refractive power are cemented, and form a cemented lens CL1.

A cover glass CG is stuck to a front surface of an image pickup element which is not shown in the diagrams. The plane parallel plate F1 and a plane parallel plate F2 are filters to which a coating to cut off specific wavelengths such as 1060 nm of a YAG laser and 810 nm of a semiconductor laser, or an infrared region, has been applied.

FIG. 5A, FIG. 5B, FIG. 5C, and FIG. 5D show a spherical aberration (SA), an astigmatism (AS), a distortion (DT), and a chromatic aberration of magnification (CC) in the normal observation state of the present example.

FIG. 5E, FIG. 5F, FIG. 5G, and FIG. 5H show a spherical aberration (SA), an astigmatism (AS), a distortion (CT), and a chromatic aberration of magnification (CC) in the close observation state of the present example.

EXAMPLE 3

An objective optical system according to an example 3 will be described below.

Figure 6A:
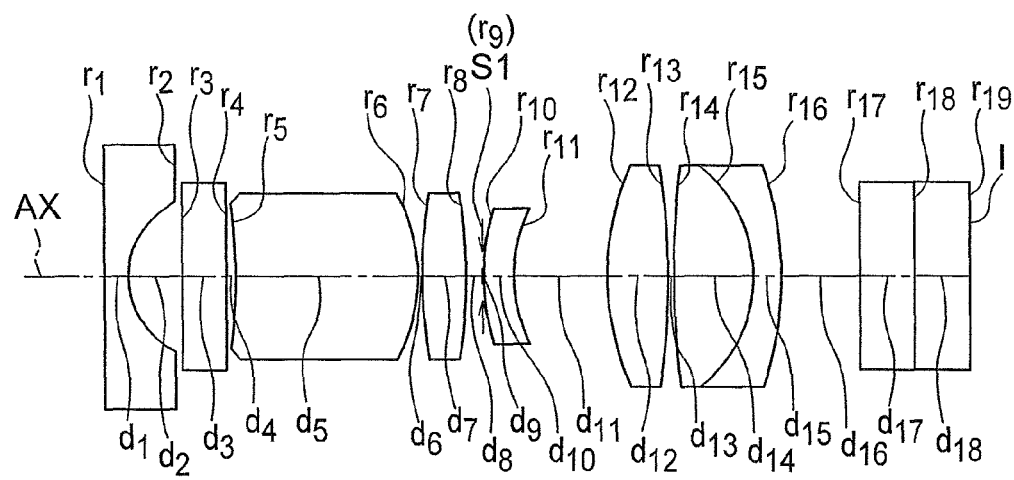
FIG. 6A and FIG. 6B are diagrams showing a cross-sectional arrangement of an objective optical system according to an example 3 of the present invention, where.
Figure 6B:
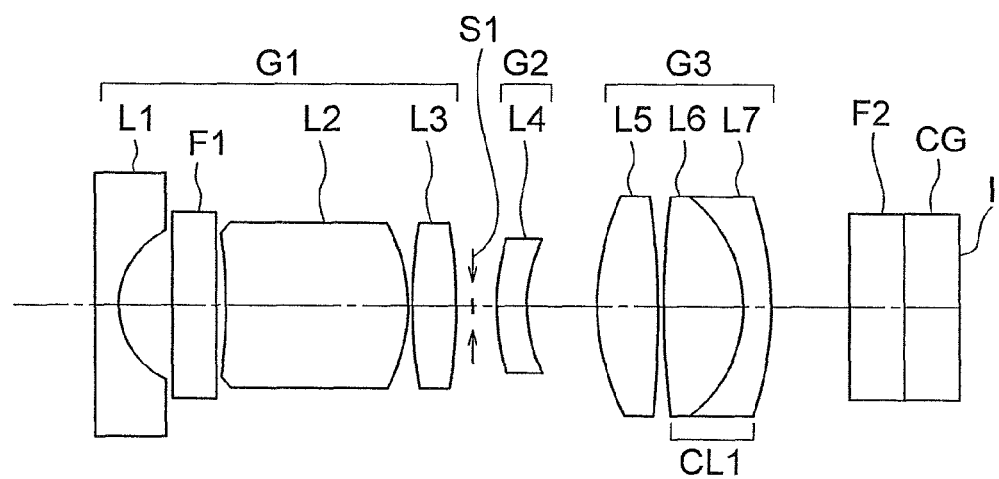

FIG. 6A is a cross-sectional view of the objective optical system according to the present example in a normal observation state (object point at a long distance), and FIG. 6B is a cross-sectional view of the objective optical system according to the present example in a close observation state (object point at a short distance).

As shown in FIG. 6A and FIG. 6B, the objective optical system includes in order from an object side, a first unit G1 having a positive refractive power, an aperture stop S1, a second unit G2 having a negative refractive power, and a third unit G3 having a positive refractive power.

The first unit G1 having a positive refractive power includes in order from the object side, a first lens L1 having a negative refractive power which is a planoconcave lens, a plane parallel plate F1, a second meniscus lens L2 having a positive refractive power of which a convex surface is directed toward an image side, and a third lens L3 having a positive refractive power which is a biconvex lens. The aperture stop S1 is disposed posterior to (at an image-plane I side) the first unit G1.

The second unit G2 having a negative refractive power includes a fourth meniscus lens L4 having a negative refractive power of which a convex surface is directed toward the object side. The fourth meniscus lens L4 having a negative refractive power moves toward the image side (image plane I) along an optical axis AX at the time of focusing from the normal observation state (FIG. 6A) to the close observation state (FIG. 6B).

The third unit G3 having a positive refractive power includes a fifth lens L5 having a positive refractive power which is a biconvex lens, a sixth lens L6 having a positive refractive power which is a biconvex lens, and a seventh meniscus lens L7 having a negative refractive power of which a convex surface is directed toward the image side. The sixth lens L6 having a positive refractive power and the seventh meniscus lens L7 having a negative refractive power are cemented, and form a cemented lens CL1.

The plane parallel plate F1 is disposed posterior to (at an image plane I side) the first lens L1. Moreover, a cover glass CG is stuck to a front surface of an image pickup element which is not shown in the diagrams. In the present example, a plane parallel plate F2 is cemented to an entire surface of the cover glass CG.

The plane parallel plates F1 and F2 are filters to which a coating to cut off specific wavelengths such as 1060 nm of a YAG laser and 810 nm of a semiconductor laser, or an infrared region, has been applied.

FIG. 7A, FIG. 7B, FIG. 7C, and FIG. 7D show a spherical aberration (SA), an astigmatism (AS), a distortion (DT), and a chromatic aberration of magnification (CC) in the normal observation state of the present example.

FIG. 7E, FIG. 7F, FIG. 7G, and FIG. 7H show a spherical aberration (SA), an astigmatism (AS), a distortion (DT), and a chromatic aberration of magnification (CC) in the close observation state of the present example.

EXAMPLE 4

An objective optical system according to an example 4 will be described below.

Figure 8A:
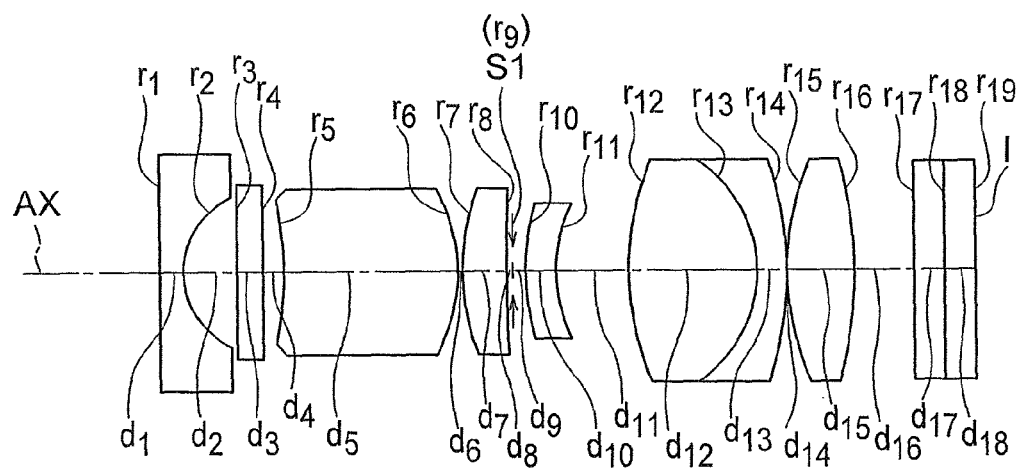
FIG. 8A and FIG. 8B are diagrams showing a cross-sectional arrangement of an objective optical system according to an example 4 of the present invention, where.
Figure 8B:
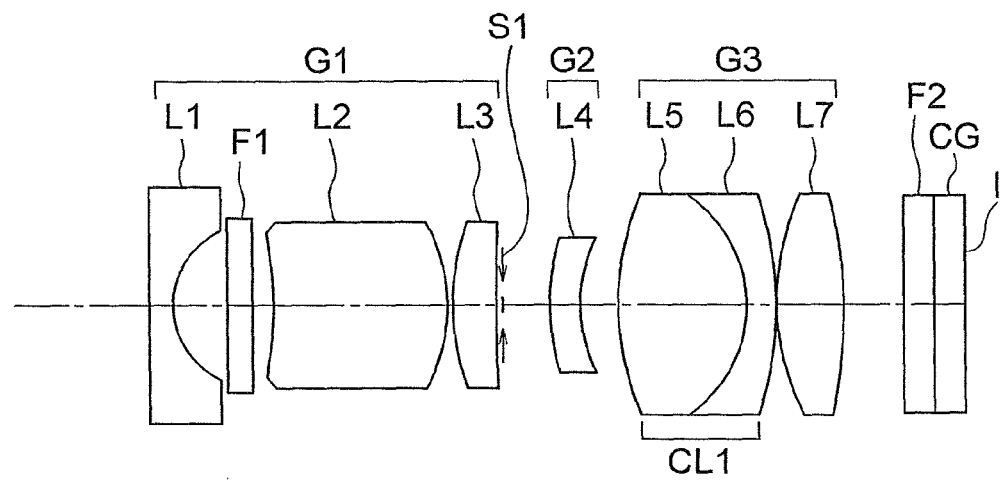

FIG. 8A is a cross-sectional view of the objective optical system according to the present example in a normal observation state (object point at a long distance), and FIG. 8B is a cross-sectional view of the objective optical system according to the present example in a close observation state (object point a short distance).

As shown in FIG. 8A and FIG. 8B, the objective optical system includes in order from an object side, a first unit G1 having a positive refractive power, an aperture stop S1, a second unit G2 having a negative refractive power, and a third unit G3 having a positive refractive power.

The first unit G1 having a positive refractive power includes in order from the object side, a first lens L1 having a negative refractive power which is a planoconcave lens, a plane parallel plate F1, a second meniscus lens L2 having a positive refractive power of which a convex surface is directed toward an image side, and a third meniscus lens L3 having a positive refractive power of which a convex surface is directed toward the object side. The aperture stop S1 is disposed posterior to (at an image-plane I side) the first unit G1.

The second unit G2 having a negative refractive power includes a fourth meniscus lens L4 having a negative refractive power of which a convex surface is directed toward the object side. The fourth meniscus lens L4 having a negative refractive power moves toward the image side (image plane I) along an optical axis AX at the time of focusing from the normal observation state (FIG. 8A) to the close observation state (FIG. 8B).

The third unit G3 having a positive refractive power includes a fifth lens L5 having a positive refractive power which is a biconvex lens, a sixth meniscus lens L6 having a negative refractive power of which a convex surface is directed toward the image side, and a seventh lens L7 having a positive refractive power which is a biconvex lens. The fifth lens L5 having a positive refractive power and the sixth lens L6 having a negative refractive power are cemented, and form a cemented lens CL1.

A cover glass CG is stuck to a front surface of an image pickup element which is not shown in the diagrams. In the example 4, a plane parallel plate F2 is cemented to an entire surface of the cover glass CG.

The plane parallel plates F1 and F2 are filters to which a coating to cut off specific wavelengths such as 1060 nm of a YAG laser and 810 nm of a semiconductor laser, or an infrared region, has been applied.

FIG. 9A, FIG. 9B, FIG. 9C, and FIG. 9D show a spherical aberration (SA), an astigmatism (AS), a distortion (DT), and a chromatic aberration of magnification (CC) in the normal observation state of the present example.

FIG. 9E, FIG. 9F, FIG. 9G, and FIG. 9H show a spherical aberration (SA), an astigmatism (AS), a distortion (DT), and a chromatic aberration of magnification (CC) in the close observation state of the present example.

EXAMPLE 5

An objective optical system according to an example 4 will be described below.

Figure 10A:
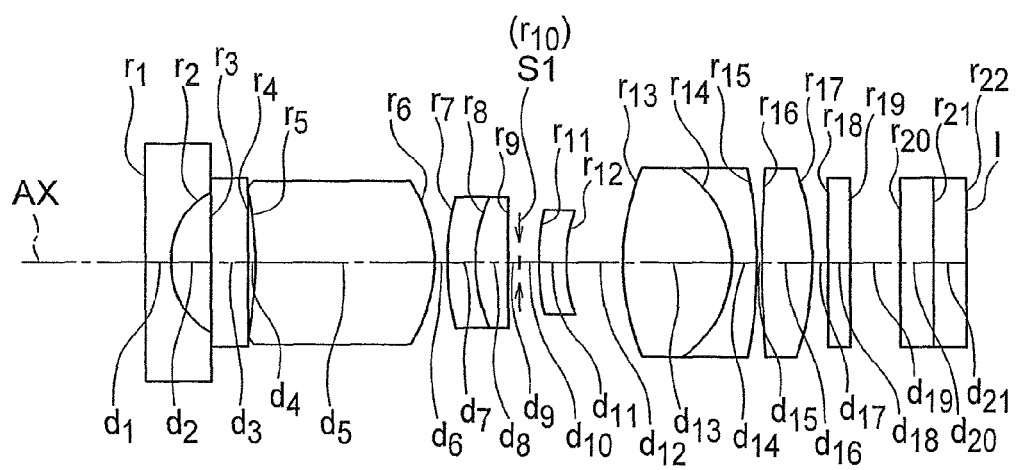
FIG. 10A and FIG. 10B are diagrams showing a cross-sectional arrangement of an objective optical system. according to an example 5 of the present invention, where.
Figure 10B:
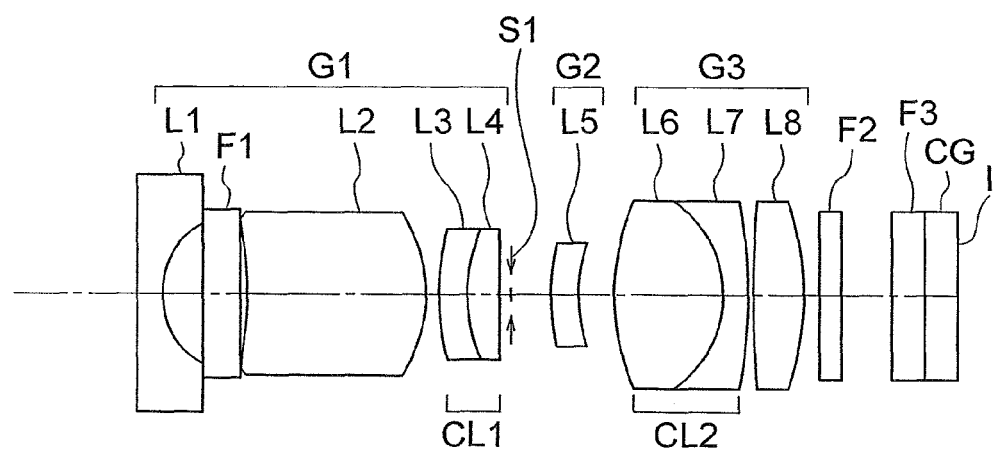

FIG. 10A is a cross-sectional view of the objective optical system according to the present example in a normal observation state (object point at a long distance), and FIG. 10B is a cross-sectional view of the objective optical system according to the present example in a close observation state (object point at a short distance).

As shown in FIG. 10A and FIG. 10B, the objective optical system includes in order from an object side, a first unit G1 having a positive refractive power, an aperture stop S1, a second unit G2 having a negative refractive power, and a third unit G3 having a positive refractive power.

The first unit G1 having a positive refractive power includes in order from the object side, a first lens L1 having a negative refractive power which is a planoconcave lens, a plane parallel plate F1, a second meniscus lens L2 having a positive refractive power of which a convex surface is directed toward an image side, a third meniscus lens L3 having a negative refractive power of which a convex surface is directed toward the object side, and a fourth lens L4 having a positive refractive power which is a biconvex lens. The third meniscus lens L3 having a negative refractive power and the fourth lens L4 having a positive refractive power are cemented, and form a cemented lens CL1. The aperture stop S1 is disposed posterior to (at an image-plane I side) the first unit G1.

The second unit G2 having a negative refractive power includes a fifth meniscus lens L5 having a negative refractive power of which a convex surface is directed toward the object side. The fifth meniscus lens L5 having a negative refractive power moves toward the image side (image plane I) along an optical axis AX at the time of focusing from the normal observation state (FIG. 10A) to the close observation state (FIG. 10B).

The third unit G3 having a positive refractive power includes a sixth lens L6 having a positive refractive power which is a biconvex lens, a seventh meniscus lens L7 having a negative refractive power of which a convex surface is directed toward the image side, and an eighth lens L8 having a positive refractive power which is a biconvex lens. The sixth lens L6 having a positive refractive power and the seventh meniscus lens L7 having a negative refractive power are cemented, and form a cemented lens CL2.

A plane parallel plate F2 is disposed posterior to (at an image-plane I side) the third unit G3. A cover glass CG is stuck to a front surface of an image pickup element which is not shown in the diagrams. In the present example, a plane parallel plate F3 is cemented to an entire surface of the cover glass CG.

The plane parallel plates F1 and F2 are filters to which a coating to cut off specific wavelengths such as 1060 nm of a YAG laser and 810 nm of a semiconductor laser, or an infrared region, has been applied.

FIG. 11A, FIG. 11B, FIG. 11C, and FIG. 11D show a spherical aberration (SA), an astigmatism (AS), a distortion (DT), and a chromatic aberration of magnification (CC) in the normal observation state of the present example.

FIG. 11E, FIG. 11F, FIG. 11G, and FIG. 11H show spherical aberration (SA), an astigmatism (AS), a distortion (DT), and a chromatic aberration of magnification (CC) in the close observation state of the present example.

Numerical data for each example described above is shown below. Regarding symbols in the numerical data, r denotes a radius of curvature of each lens surface, d denotes a distance between lens surfaces, ne denotes a refractive index of each lens for e-line, vd denotes Abbe's number for each lens, and Fno denotes the F-number.

EXAMPLE 1

| Unit mm | | | | |
|---|---|---|---|---|
| Surface data | | | | |
| Surface no. | r | d | ne | vd |
| 1 | ∞ | 0.20 | 1.88815 | 40.76 |
| 2 | 0.615 | 0.50 | | |
| 3 | −2.775 | 1.51 | 1.48915 | 70.23 |
| 4 | −1.043 | 0.25 | 2.01169 | 28.27 |
| 5 | −1.242 | 0.03 | | |
| 6 | 1.846 | 0.33 | 1.75453 | 35.33 |
| 7 | 9.075 | 0.16 | | |
| 8 (Stop) | ∞ | Variable | | |
| 9 | 1.416 | 0.22 | 1.88815 | 40.76 |
| 10 | 0.924 | Variable | | |
| 11 | 2.992 | 0.86 | 1.73234 | 54.68 |
| 12 | −1.109 | 0.23 | 1.93429 | 18.90 |
| 13 | −5.338 | 0.03 | | |
| 14 | 2.210 | 0.64 | 1.53947 | 74.70 |
| 15 | −2.120 | 0.08 | | |
| 16 | ∞ | 0.30 | 1.51500 | 75.00 |
| 17 | ∞ | 0.28 | | |
| 18 | ∞ | 0.30 | 1.51825 | 64.14 |
| 19 | ∞ | 0.30 | 1.52207 | 60.00 |
| 20 (Image pickup surface) | | | | |

| Various data | | |
|---|---|---|
| Parameter | Normal observation state | Close observation state |
| focal length | 0.502 | 0.514 |
| Fno | 3.00 | 3.09 |
| object distance | 12.8 | 4.28 |
| d8 | 0.03 | 0.17 |
| d10 | 0.44 | 0.30 |

Pixel pitch of image pickup element: 0.001 mm

EXAMPLE 2

| Unit mm | | | | |
|---|---|---|---|---|
| Surface data | | | | |
| Surface no. | r | d | ne | vd |
| 1 | ∞ | 0.20 | 1.88815 | 40.76 |
| 2 | 0.643 | 0.31 | | |
| 3 | ∞ | 0.30 | 1.51500 | 75.00 |
| 4 | ∞ | 0.14 | | |
| 5 | −1.779 | 1.43 | 1.48915 | 70.23 |
| 6 | −1.291 | 0.03 | | |
| 7 | 2.472 | 0.28 | 1.75453 | 35.33 |
| 8 | −1688.228 | 0.11 | | |
| 9 (Stop) | ∞ | Variable | | |
| 10 | 1.678 | 0.22 | 1.88815 | 40.76 |
| 11 | 1.304 | Variable | | |
| 12 | 3.908 | 0.78 | 1.73234 | 54.68 |
| 13 | −1.099 | 0.19 | 1.93429 | 18.90 |
| 14 | −3.382 | 0.03 | | |
| 15 | 1.790 | 0.54 | 1.48915 | 70.23 |
| 16 | −4.902 | 0.47 | | |
| 17 | ∞ | 0.35 | 1.51825 | 64.14 |
| 18 | ∞ | 0.40 | 1.52218 | 60.00 |
| 19 (Image pickup surface) | | | | |

| Various data | | |
|---|---|---|
| Parameter | Normal observation state | Close observation state |
| focal length | 0.501 | 0.517 |
| Fno | 3.46 | 3.59 |
| object distance | 12.5 | 4.2 |
| d9 | 0.03 | 0.48 |
| d11 | 0.73 | 0.28 |

Pixel pitch of image pickup element: 0.0012 mm

EXAMPLE 3

| Unit mm | | | | |
|---|---|---|---|---|
| Surface data | | | | |
| Surface no. | r | d | ne | vd |
| 1 | ∞ | 0.21 | 1.88815 | 40.76 |
| 2 | 0.750 | 0.48 | | |
| 3 | ∞ | 0.40 | 1.52300 | 65.13 |
| 4 | ∞ | 0.08 | | |
| 5 | −6.474 | 1.67 | 1.49846 | 81.54 |
| 6 | −1.470 | 0.03 | | |
| 7 | 4.363 | 0.41 | 1.69417 | 31.07 |
| 8 | −7.692 | 0.12 | | |
| 9 (Stop) | ∞ | Variable | | |
| 10 | 2.114 | 0.28 | 1.88815 | 40.76 |
| 11 | 1.340 | Variable | | |
| 12 | 2.160 | 0.57 | 1.48915 | 70.23 |
| 13 | −7.246 | 0.02 | | |
| 14 | 7.155 | 0.73 | 1.73234 | 54.68 |
| 15 | −1.322 | 0.25 | 1.97189 | 17.47 |
| 16 | −2.932 | 0.72 | | |
| 17 | ∞ | 0.50 | 1.51825 | 64.14 |
| 18 | ∞ | 0.50 | 1.51705 | 60.00 |
| 19 (Image pickup surface) | | | | |

| Various data | | |
|---|---|---|
| Parameter | Normal observation state | Close observation state |
| focal length | 0.681 | 0.701 |
| Fno | 4.18 | 4.33 |
| object distance | 16.5 | 6.04 |
| d9 | 0.03 | 0.24 |
| d11 | 0.85 | 0.64 |

Pixel pitch of image pickup element: 0.0014 mm

EXAMPLE 4

Unit mm

Surface data

| Surface no. | r | d | ne | vd |
|---|---|---|---|---|
| 1 | ∞ | 0.38 | 1.88815 | 40.76 |
| 2 | 1.343 | 0.86 | | |
| 3 | ∞ | 0.40 | 1.52300 | 65.13 |
| 4 | ∞ | 0.34 | | |
| 5 | −4.495 | 2.83 | 1.49846 | 81.54 |
| 6 | −2.622 | 0.05 | | |
| 7 | 3.753 | 0.72 | 1.65222 | 33.79 |
| 8 | 26.231 | 0.10 | | |
| 9 (Stop) | ∞ | Variable | | |
| 10 | 4.837 | 0.48 | 1.58482 | 40.75 |
| 11 | 2.572 | Variable | | |
| 12 | 4.333 | 2.02 | 1.73234 | 54.08 |
| 13 | −2.096 | 0.48 | 1.93429 | 18.90 |
| 14 | −7.265 | 0.04 | | |
| 15 | 4.212 | 1.08 | 1.49846 | 81.54 |
| 16 | −7.951 | 1.00 | | |
| 17 | ∞ | 0.50 | 1.51825 | 64.14 |
| 18 | ∞ | 0.50 | 1.50192 | 60.00 |
| 19 (Image pickup surface) | | | | |

Various data

| Parameter | Normal observation state | Close observation state |
|---|---|---|
| focal length | 0.997 | 1.053 |
| Fno | 4.62 | 4.90 |
| object distance | 18.5 | 6.64 |
| d9 | 0.22 | 0.92 |
| d11 | 1.18 | 0.48 |

Pixel pitch of image pickup element: 0.0016 mm

EXAMPLE 5

Unit mm

Surface data

| Surface no. | r | d | ne | vd |
|---|---|---|---|---|
| 1 | ∞ | 0.32 | 1.88815 | 40.76 |
| 2 | 1.203 | 0.66 | | |
| 3 | ∞ | 0.55 | 1.51825 | 64.14 |
| 4 | ∞ | 0.17 | | |
| 5 | −4.943 | 2.72 | 1.48915 | 70.23 |
| 6 | −2.267 | 0.14 | | |
| 7 | 3.571 | 0.42 | 1.85504 | 23.78 |
| 8 | 2.154 | 0.51 | 1.69417 | 31.07 |
| 9 | −95.823 | 0.16 | | |
| 10 (Stop) | ∞ | Variable | | |
| 11 | 4.303 | 0.41 | 1.88815 | 40.76 |
| 12 | 2.336 | Variable | | |
| 13 | 3.958 | 1.66 | 1.73234 | 54.68 |
| 14 | −1.795 | 0.37 | 1.93429 | 18.90 |
| 15 | −6.782 | 0.03 | | |
| 16 | 11.979 | 0.78 | 1.67340 | 47.23 |
| 17 | −4.509 | 0.27 | | |
| 18 | ∞ | 0.30 | 1.52300 | 65.13 |
| 19 | ∞ | 0.79 | | |
| 20 | ∞ | 0.50 | 1.51825 | 64.14 |
| 21 | ∞ | 0.50 | 1.51705 | 60.00 |
| 22 (Image pickup surface) | | | | |

Various data

| Parameter | Normal observation state | Close observation state |
|---|---|---|
| focal length | 0.998 | 1.051 |
| Fno | 5.05 | 5.37 |
| object distance | 18 | 5.88 |
| d10 | 0.31 | 0.77 |
| d12 | 0.87 | 0.41 |

Pixel pitch of image pickup element: 0.0018 mm

Values corresponding to conditional expressions (1) to (16) are shown in Table 1 below.

TABLE 1

| Conditional Expression | Example 1 | Example 2 | Example 3 |
|---|---|---|---|
| (1) $d_{2g}/f$ | 0.28 | 0.90 | 0.31 |
| (2) $f_1/f$ | 1.98 | 3.07 | 2.11 |
| (3) $f_2/f$ | −7.56 | −18.19 | −7.29 |
| (4) $f_3/f$ | 3.22 | 3.38 | 3.04 |
| (5) $f_n/f$ | 1.03 | 1.03 | 1.03 |
| (6) $D_2/f$ | 3.01 | 2.86 | 2.45 |
| (7) $f_{3t}/f_{3p}$ | 1.75 | 2.20 | 2.20 |
| (8) $(Fno) \times (f)/(p \times 1000)$ | 1.50 | 1.44 | 2.03 |
| (9) $f_{th}/f$ | 0.90 | 0.90 | 0.84 |
| (10) $f_{mh}/f$ | 1.37 | 1.30 | 1.22 |
| (11) $|r_a - r_b|/|r_a + r_b|$ | 0.21 | 0.13 | 0.22 |
| (12) $f_{11}/f$ | −1.37 | −1.45 | −1.24 |
| (13-1) $\omega_f$ | 79.3 | 70.2 | −78.7 |
| (13-2) $\omega_n$ | 71.6 | 64.4 | −70.0 |
| (14) $f_{23t}/f_{23n}$ | 0.95 | 0.94 | 0.95 |
| (15) $f_2/f_3$ | −2.35 | −5.38 | −2.40 |
| (16) $f_2/f_1$ | −3.81 | −5.92 | −3.45 |

| Conditional Expression | Example 4 | Example 5 |
|---|---|---|
| (1) $d_{2g}/f$ | 0.70 | 0.46 |
| (2) $f_1/f$ | 2.81 | 2.12 |
| (3) $f_2/f$ | −10.22 | −6.39 |
| (4) $f_3/f$ | 3.14 | 2.86 |
| (5) $f_n/f$ | 1.06 | 1.05 |
| (6) $D_2/f$ | 2.84 | 2.73 |
| (7) $f_{3t}/f_{3p}$ | 2.56 | 2.58 |
| (8) $(Fno) \times (f)/(p \times 1000)$ | 2.88 | 2.80 |
| (9) $f_{th}/f$ | 0.99 | 0.86 |
| (10) $f_{mh}/f$ | 1.45 | 1.21 |
| (11) $|r_a - r_b|/|r_a + r_b|$ | 0.31 | 0.30 |
| (12) $f_{11}/f$ | −1.52 | −1.36 |
| (13-1) $\omega_f$ | 80.5 | 67.1 |
| (13-2) $\omega_n$ | 67.0 | 59.1 |
| (14) $f_{23t}/f_{23n}$ | 0.92 | 0.91 |
| (15) $f_2/f_3$ | −3.25 | −2.23 |
| (16) $f_2/f_1$ | −3.64 | −3.02 |

Various embodiments of the present invention have been described above. However, the present invention should not be construed as being limited to these embodiments only, and embodiments arranged by combining appropriately the arrangements of these embodiments without departing from the scope of the present invention are also to be included.

An objective optical system according to an embodiment of the present invention shows an effect that it is possible to provide an objective optical system which is fast, and for which a change in the angle of view at the time of focusing is small, and which has an adequate depth of field at each object-point distance, and a superior performance corresponding to an image pickup element with a large number of pixels.

(Appendix)

Inventions of the following arrangements are derived from the examples described above.

(Appended Mode 1)

An objective optical system, comprising in order from an object side:
 a first unit having a positive refractive power;
 a second unit having a negative refractive power; and
 a third unit having a positive refractive power, wherein focusing is carried out by moving the second unit, and
 the first unit includes in order from the object side, a negative lens, one of a positive lens and a cemented lens, and a positive lens, and
 the third unit includes a positive lens, and a cemented lens of a positive lens and a negative lens.

(Appended Mode 2)

An objective optical system, comprising in order from an object side:
 a first unit having a positive refractive power;
 a second unit having a negative refractive power; and
 a third unit having a positive refractive power, wherein
 the second unit includes a meniscus lens having a convex surface directed toward the object side, and
 focusing is carried out by moving the second unit on an optical axis, and
 the objective optical system satisfies the following conditional expression (1)

$$0.12 < d_{2g}/f < 1.02 \quad (1)$$

where,
 $d_{2g}$ denotes an amount of movement of the second unit, and
 f denotes a focal length of the overall objective optical system in a normal observation state.

(Appended Mode 3)

The objective optical system according to any one of appended modes 1 and 2, wherein the objective optical system satisfies at least one of the following conditional expressions (2), (3), and (4)

$$1.8 < f_1/f < 4.2 \quad (2)$$

$$-20 < f_2/f < -5 \quad (3)$$

$$2 < f_3/f < 5 \quad (4)$$

where,
 f denotes the focal length of the overall optical system in the normal observation state,
 $f_1$ denotes a focal length of the first unit,
 $f_2$ denotes a focal length of the second unit, and
 $f_3$ denotes a focal length of the third unit.

(Appended Mode 4)

The objective optical system according to any one of appended modes 1 and 2, wherein the objective optical system satisfies the following conditional expression (5)

$$0.85 < f_n/f < 1.15 \quad (5)$$

where,
 f denotes the focal length of the overall objective optical system in the normal observation state, and
 $f_n$ denotes a focal length of the overall objective optical system in the close observation state.

(Appended Mode 5)

The objective optical system according to any one of appended modes 1 and 2, wherein the objective optical system satisfies the following conditional expression (6)

$$1.6 < D_2/f < 3.8 \quad (6)$$

where,
 f denotes the focal length of the overall objective optical system in the normal observation state, and
 $D_2$ denotes a lens thickness of the second lens.

(Appended Mode 6)

The objective optical system according to any one of appended modes 1 and 2, wherein the objective optical system satisfies the following conditional expression (7)

$$1.2 < f_{3t}/f_{3p} < 3.6 \quad (7)$$

where,
 $f_{3t}$ denotes a focal length of a positive single lens in the third unit, and
 $f_{3p}$ denotes a focal length of a positive lens in the cemented lens of the third unit.

(Appended Mode 8)

The objective optical system according to any one of appended modes 1 and 2, wherein
 the objective optical system includes a rearmost lens which is disposed nearest to an image, and
 satisfies the following conditional expression (9)

$$0.74 < f_{th}/f < 1.12 \quad (9)$$

where,
 f denotes a focal length of the overall objective optical system in the normal observation state, and
 $f_{th}$ denotes the maximum height of a diagonal principal light ray at an image-side surface of the rearmost lens.

(Appended Mode 9)

The objective optical system according to any one of appended modes 1 and 2, wherein
 the objective optical, system includes a first lens which is disposed nearest to an object, and
 satisfies the following conditional expression (10)

$$1.02 < f_{mh}/f < 1.58 \quad (10)$$

where,
 f denotes a focal length of the overall objective optical system in the normal observation state, and
 $f_{mh}$ denotes the maximum height of a diagonal principal light ray at an object-side surface of the first lens.

(Appended Mode 10)

The objective optical system according to any one of appended modes 1 and 2, wherein the objective optical system satisfies the following conditional expression (11)

$$0.1 < |r_a - r_b|/|r_a + r_b| < 0.4 \quad (11)$$

where,
 $r_a$ denotes a radius of curvature of a surface nearest to an object of the second unit, and
 $r_b$ denotes a radius of curvature of surface nearest to an image of the second unit.

(Appended Mode 11)

The objective optical system according to any one of appended modes 1 and 2, wherein
 the objective optical system includes a first lens which is disposed nearest to the object, and
 satisfies the following conditional expression (12)

$$-2.2 < f_{11}/f < -0.8 \quad (12)$$

where,
$f_{11}$ denotes a focal length of the first lens, and
f denotes the focal length of the overall objective optical system in the normal observation state.

(Appended Mode 12)

The objective optical system according to any one of appended modes 1 and 2, wherein the objective optical system satisfies the following conditional expressions (13-1) and (13-2) simultaneously $$\omega_f > 60° \qquad (13\text{-}1)$$

$$\omega_n > 50° \qquad (13\text{-}2)$$

where,
$\omega_f$ denotes a half angle of view in the normal observation state of the objective optical system, and
$\omega_n$ denotes a half angle of view in the close observation state of the objective optical system.

(Appended Mode 13)

The objective optical system according to any one of appended modes 1 and 2, wherein the objective optical system satisfies the following conditional expression (14)

$$0.8 < f_{23f}/f_{23n} < 1.2 \qquad (14)$$

where,
$f_{23f}$ denotes a combined focal length of the second unit and the third unit in the normal observation state, and
$f_{23n}$ denotes a combined focal length of the second unit and the third unit in the close observation state.

(Appended Mode 14)

The objective optical system according to any one of appended modes 1 and 2, wherein the objective optical system satisfies the following conditional expression (15)

$$-8 < f_2/f_3 < -2 \qquad (15)$$

where,
$f_2$ denotes the focal length of the second unit, and
$f_3$ denotes the focal length of the third unit.

(Appended Mode 15)

The objective optical system according to any one of appended modes 1 and 2, wherein the objective optical system satisfies the following conditional expression (16)

$$-8.2 < f_2/f_1 < -2.8 \qquad (16)$$

where,
$f_1$ denotes the focal length of the first unit, and
$f_2$ denotes the focal length of the second unit.

(Appended Mode 16)

The objective optical system according to appended mode 2, wherein the objective optical system satisfies the following conditional expression (1')

$$0.22 < d_{2g}/f < 0.94 \qquad (1').$$

(Appended Mode 17)

The objective optical system according to appended mode 3, wherein the objective optical system satisfies the following conditional expression (4')

$$2.7 < f_3/f < 5 \qquad (4')$$

(Appended Mode 18)

The objective optical system according to appended mode 4, wherein the objective optical system satisfies the following conditional expression (5')

$$0.95 < f_{rf}/f < 1.1 \qquad (5').$$

(Appended Mode 19)

The objective optical system according to appended mode 5, wherein the objective optical system satisfies the following conditional expression (6')

$$2.2 < D_2/f < 3.2 \qquad (6').$$

(Appended Mode 20)

The objective optical system according to appended mode 6, wherein the objective optical system satisfies the following conditional expression (7')

$$1.6 < f_{3f}/f_{3p} < 3.2 \qquad (7').$$

(Appended Mode 21)

The objective optical system according to appended mode 11, wherein the objective optical system satisfies the following conditional expression (12')

$$-1.8 < f_{11}/f < -1.2 \qquad (12').$$

(Appended Mode 22)

The objective optical system according to appended mode 13, wherein the objective optical system satisfies the following conditional expression (14')

$$0.9 < f_{23f}/f_{23n} < 1.0 \qquad (14').$$

(Appended Mode 7)

An image pickup apparatus comprising:
an objective optical system according to any of appended modes 1 to 16 and 8 to 22; and
an image pickup element, wherein
the image pickup apparatus satisfies the following conditional expression (8)

$$1.2 < (Fno) \times (f)/(p \times 1000) < 3.2 \qquad (8)$$

where,
f denotes the focal length of the overall objective optical system in the normal observation state,
Fno denotes an F-number in the normal observation state, and
P denotes a pixel pitch of the image pickup element.

INDUSTRIAL APPLICABILITY

The present invention relates to an objective optical system which has a focusing function, and particularly, to an objective lens for endoscope which enables a close observation, and to a taking lens of other small-size cameras for consumer use.

What is claimed is:
1. An objective optical system, comprising in order from an object side:
a first unit having a positive refractive power;
a second unit having a negative refractive power; and
a third unit having a positive refractive power, wherein:
focusing is carried out by moving the second unit,
the first unit and the third unit are fixed at a time of the focusing,
the first unit includes, in order from the object side, a negative lens, one of a positive lens and a cemented lens, and a positive single lens,
the third unit includes a positive lens, and a cemented lens of a positive lens and a negative lens, and
the objective optical system satisfies the following conditional expression (3)

$$-20 < f_2/f < -5 \qquad (3)$$

where:

$f_2$ denotes a focal length of the second unit, and f denotes a focal length of the overall objective optical system in a normal observation state.

2. An objective optical system, comprising in order from an object side:

a first unit having a positive refractive power;

a second unit having a negative refractive power; and a third unit having a positive refractive power, wherein:

the second unit includes a meniscus lens having a convex surface directed toward the object side, focusing is carried out by moving the second unit on an optical axis, the first unit and the third unit are fixed at a time of the focusing, and the objective optical system satisfies the following conditional expressions (1), (2), and (3)

$$0.12 < d_{2g}/f < 1.02 \tag{1}$$

$$1.8 < f_1/f < 4.2 \tag{2}$$

$$-20 < f_2/f < -5 \tag{3}$$

where:

$d_{2g}$ denotes an amount of movement of the second unit, f denotes a focal length of the overall objective optical system in a normal observation state, f1 denotes a focal length of the first unit, and f2 denotes a focal length of the second unit.

3. An objective optical system, comprising in order from an object side:

a first unit having a positive refractive power;

a second unit having a negative refractive power; and a third unit having a positive refractive power, wherein:

focusing is carried out by moving the second unit, the first unit and the third unit are fixed at a time of the focusing, the first unit includes, in order from the object side, a negative lens, one of a positive lens and a cemented lens, and a positive single lens, the third unit includes a positive lens, and a cemented lens of a positive lens and a negative lens, and the objective optical system satisfies the following conditional expression (3')

$$-20 < f_2/f \leq -6.39 \tag{3'}$$

where:

$f_2$ denotes a focal length of the second unit, and f denotes a focal length of the overall objective optical system in a normal observation state.

* * * * *